US012388679B2

(12) United States Patent
Gupta et al.

(10) Patent No.: US 12,388,679 B2
(45) Date of Patent: Aug. 12, 2025

(54) FULL MESH PROXYLESS CONNECTIVITY BETWEEN NETWORKS

(71) Applicant: Google LLC, Mountain View, CA (US)

(72) Inventors: Anshuman Gupta, Sunnyvale, CA (US); Pavlin Radoslavov, Cupertino, CA (US); Kannan Sattainathan, Fremont, CA (US); Alok Kumar, Fremont, CA (US); Yossi Richter, San Jose, CA (US)

(73) Assignee: Google LLC, Mountain View, CA (US)

( * ) Notice: Subject to any disclaimer, the term of this patent is extended or adjusted under 35 U.S.C. 154(b) by 461 days.

(21) Appl. No.: 17/859,558

(22) Filed: Jul. 7, 2022

(65) Prior Publication Data

US 2023/0379191 A1    Nov. 23, 2023

Related U.S. Application Data

(60) Provisional application No. 63/344,842, filed on May 23, 2022.

(51) Int. Cl.
*H04L 12/66* (2006.01)
*H04L 45/74* (2022.01)
*H04L 67/10* (2022.01)

(52) U.S. Cl.
CPC .............. *H04L 12/66* (2013.01); *H04L 45/74* (2013.01); *H04L 67/10* (2013.01)

(58) Field of Classification Search
None
See application file for complete search history.

(56) References Cited

U.S. PATENT DOCUMENTS

| 10,193,968 | B2 | 1/2019 | Alpert et al. | |
| 10,999,163 | B2 | 5/2021 | Abraham | |
| 2015/0381493 | A1* | 12/2015 | Bansal | H04L 45/741 370/392 |
| 2018/0069754 | A1 | 3/2018 | Dasu et al. | |
| 2018/0262387 | A1 | 9/2018 | Mathew et al. | |
| 2018/0307522 | A1 | 10/2018 | Wu et al. | |
| 2019/0319847 | A1* | 10/2019 | Nahar | G06F 9/45558 |
| 2020/0067734 | A1 | 2/2020 | Hira et al. | |
| 2020/0213225 | A1* | 7/2020 | Han | H04L 47/829 |
| 2020/0382345 | A1 | 12/2020 | Zhao et al. | |
| 2024/0223451 | A1* | 7/2024 | Almadani | H04L 41/122 |

FOREIGN PATENT DOCUMENTS

EP        2963866 A2     1/2016

OTHER PUBLICATIONS

Extended European Search Report for European Patent Application No. 22204203.8 dated May 15, 2023. 9 pages.

* cited by examiner

*Primary Examiner* — Ayman A Abaza
*Assistant Examiner* — Abdul Aziz Santarisi
(74) *Attorney, Agent, or Firm* — Lerner David LLP

(57) ABSTRACT

The present disclosure provides for full mesh connectivity between all endpoints in a VPC, including virtual machines, load balancers, routers, interconnects, virtual private networks, etc. Connectivity may be extended to on-premises devices, such as those connected via VPN and Interconnects. The connectivity is high performance, reliable, and secure.

20 Claims, 10 Drawing Sheets

FULL MESH PROXYLESS CONNECTIVITY BETWEEN NETWORKS

CROSS-REFERENCE TO RELATED APPLICATIONS

The present application claims the benefit of the filing date of U.S. Provisional Patent Application No. 63/344,842 filed May 23, 2022, the disclosure of which is hereby incorporated herein by reference.

BACKGROUND

Virtual Private Cloud (VPC) provides both connectivity as well as an administrative boundary in public clouds. However, sometimes a workload in a VPC needs to connect to resources in another VPC in a different administrative domain.

BRIEF SUMMARY

The present disclosure provides for full mesh connectivity between all endpoints in a VPC. Such endpoints include, for example, virtual machines, load balancers, routers, interconnects, virtual private networks, etc. Connectivity may be extended to on-premises devices, such as those connected via VPN and Interconnects. The connectivity is high performance, reliable, and secure.

One aspect of the disclosure provides a system, comprising a software-defined networking (SDN) controller, an on-host controller, and a programmable packet switcher, wherein the SDN controller, on-host controller, and programmable packet switcher are communicatively coupled within a first network, wherein the on-host controller is programmed to receive limited connectivity information from a target network, and use the limited connectivity information to establish a proxyless peering connection between the source network and the target network. The system may include a first virtual machine within the first network. The first virtual machine and the on-host controller may reside on a same host machine. In some examples, the first network is a virtual private cloud (VPC).

The limited connectivity information may comprise a destination address in the target network. It may further comprise forwarding information.

According to some examples, the programmable packet switcher delivers packets from a first virtual machine in the source network to a second virtual machine in the target network using the limited connectivity information.

According to some examples, the source network includes a plurality of endpoints, and each endpoint in the source network is adapted to communicate directly with each endpoint in the target network using the proxyless peering connection.

According to some examples, the system may further comprise a plurality of SDN controllers in a fully sharded control plane, each of the plurality of SDN controller responsible for a subset of virtual private cloud (VPC) networks in a peering group, each VPC network having an associated on-host controller, wherein each of the plurality of SDN controllers is coupled to each of the associated on-host controllers.

According to some examples, the system may further comprise a scalable gateway between the programmable packet switch of the first network and a second programmable packet switcher of the second network.

Another aspect of the disclosure provides a method of establishing a peering connection between a first network and a second network. The method may include receiving, at an on-host controller in the first network, programming information from a first controller within the first network, receiving, at the on-host controller in the first network, connectivity information from a second controller within the second network, establishing a proxyless peering connection between the first network and the second network using at least the received connectivity information, and providing, to a packet switcher within the first network, packet information for direct communication between a first endpoint in the first network and a second endpoint in the second network. The first endpoint may be a virtual machine. Receiving the connectivity information from the second controller may include using the programming information from the first controller to subscribe to the second controller. The connectivity information may include a destination address in the second network and forwarding information.

According to some examples, the method may further include delivering, by the programmable packet switcher, packets from a first virtual machine in the first network to a second virtual machine in the second network using the connectivity information.

Yet another aspect of the disclosure provides a software-defined networking (SDN) controller executable on one or more processors for performing a method of establishing a peering connection between a first network that includes the SDN controller and a second network. The SDN controller may be configured to provide programming information to an on-host controller in the first network, the programming information identifying the second network and causing the on-host controller to subscribe to a second SDN controller in the second network. According to some examples, the SDN controller includes a peering multiplexer configured to receive information from a plurality of resources and publish routing information for communicating with the resources. According to some examples, the SDN controller includes a peering manager maintaining one or more export policies for the first network, wherein the peering multiplexer performs multiplexing on the resources based on the export policies. According to some examples, the SDN controller includes a routing manager configured to receive route information from one or more other SDN controllers. According to some examples, the SDN controller is configured to identify route conflicts based on the route information received and to resolve the conflict using a pre-defined set of rules.

DETAILED DESCRIPTION

Figure 1:
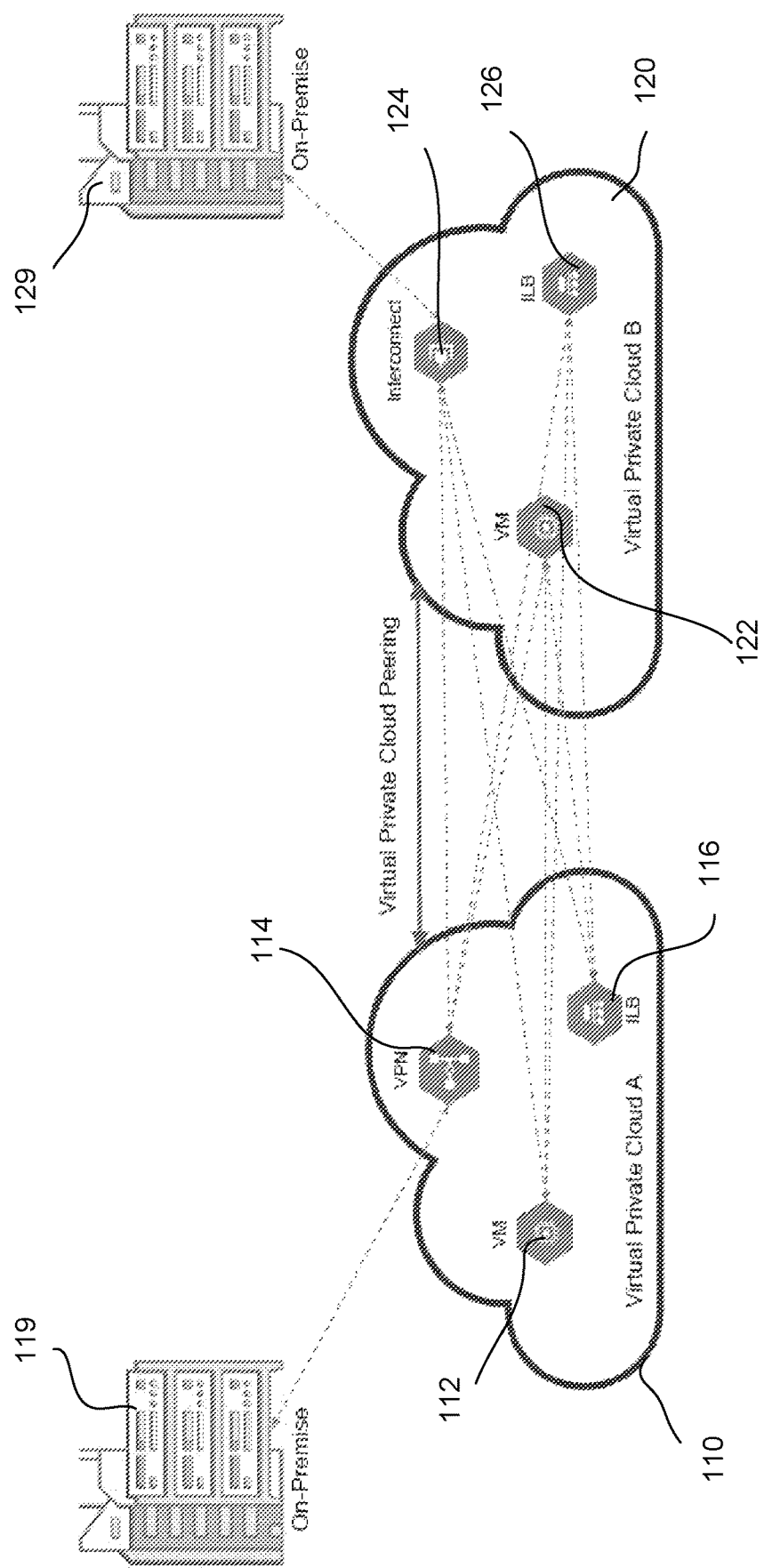
FIG. 1 is a pictorial diagram illustrating connectivity between two VPCs, according to aspects of the disclosure.

FIG. 1 illustrates an example of full mesh proxyless connectivity between two VPCs 110, 120. As shown, each VPC 110, 120 includes a plurality of different endpoints, such as virtual machine 112, virtual private network (VPN) connection 114, and internal load balancing (ILB) node 116 in first VPC 110, and virtual machine 122, interconnect 124, and ILB 126 in second VPC 120. While these are some examples of the types of endpoints, it should be understood that other types of endpoints may also be included in the VPCs. One example of another type of endpoint includes routers. While several endpoints are illustrated in each VPC 110, 120, it should be understood that any number of endpoints may be included in each VPC 110, 120, and that the number of computing devices in a first VPC may differ from a number of computing devices in a second VPC. Moreover, it should be understood that the number of computing devices in each VPC may vary over time, for example, as hardware is removed, replaced, upgraded, or expanded. Each of the endpoints in the first VPC 110 may be communicatively coupled with each of the endpoints in the second VPC 120.

The virtual machines 112, 122 may each represent one or more virtual machines running on one or more host machines. Each of the virtual machines 112, 122 may run an operating system and applications. While only a few virtual machines 112, 122 are illustrated, it should be understood that any number of virtual machines may be supported by any number of host computing devices.

The ILBs 116, 126 may include either or both of network load balancers, application load balancers, or other types of load balancers. According to some examples, the ILBs 116, 126 may distribute jobs or tasks among the virtual machines 112, 122. For example, the computing devices may have different capacities, such as different processing speeds, workloads, etc. In some examples, as commands are received to execute new tasks, the ILBs 116, 126 may determine which virtual machine is responsible for handling the new task. Moreover, the ILBs 116, 126 may monitor computing capacity of each of the virtual machines 112, 122 and make adjustments as needed. For example, if one virtual machine fails, the ILB 116, 126 responsible for load balancing for that virtual machine may move its processes over to one or more other virtual machines. In other examples, if one virtual machine is near capacity while another has availability, the ILB 116, 126 may move jobs, or may only send new jobs to the virtual machine with availability.

The VPN connection 114 may establish a connection between the VPC 110 and one or more on-premise devices 119. For example, the on-premise devices 119 may include routers or other devices within an organization. The VPN connection 114 establishes a protected network connection between the on-premise devices 119 and the VPC 110, such as by encrypting internet traffic.

The interconnect 124 may establish a connection between the VPC 120 and the on-premise devices 129. For example, the interconnect 124 may establish a direct physical connection between an on-premises network and the VPC 120, such as through a supported service provider.

The on-premise devices 129 may be the same or different than the on-premise devices 119. The on-premise devices 119 may belong to a same or different organization than the on-premise devices 129. The VPC peering between the VPC 110 and the VPC 120 may provide for communication of information between the VPCs 110, 120. By way of example only, the first VPC 110 may be part of a first organization which is a company that offers a database service, whereas the second VPC 120 may be part of a second organization which is a separate company with a web frontend that uses the database service. As another example, the first VPC 110 may be a first department, such as a marketing department, within an organization, and the second VPC 120 may be a second department within the same organization, such as a sales department. While these are merely two examples of VPCs for which full mesh connectivity may be beneficial, it should be understood that the description herein may apply to any of a wide variety of other contexts.

While only two on-premise networks and VPCs are shown in FIG. 1, it should be understood that multiple on-premise networks and VPCs may connect virtually. Conventionally, a view of the resources in another VPC is provided by copying the resources. This can be costly in terms of time, bandwidth consumption, memory consumption, etc. According to the present disclosure, such copying may be avoided by fetching only the information needed to establish a peering connection with the other VPC.

Figure 2:
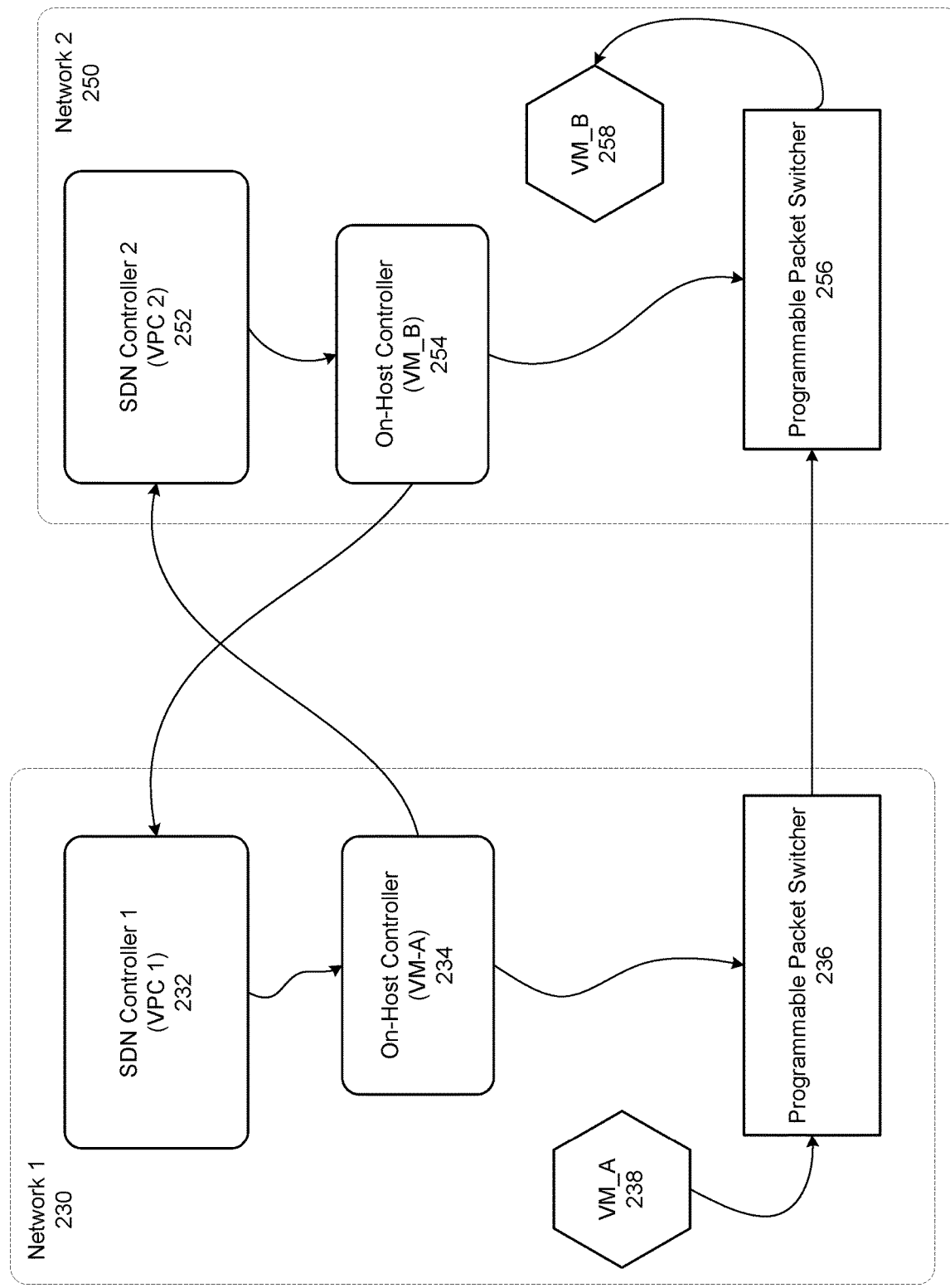
FIG. 2 is a block diagram illustrating cross-VPC connectivity in a software-defined network (SDN) architecture, according to aspects of the disclosure.

FIG. 2 illustrates an example of cross-VPC connectivity in a software-defined network (SDN) architecture. The architecture has several layers of control. In a first layer, each SDN controller 232, 252 is responsible for one of two or more networks 230, 250. In a second layer, an on-host controllers (OHC) 234, 254 in each network 230, 250 is used to obtain information for peering with the other network. When establishing a peering relationship, the OHC 234, 254 of the network 230, 250 seeks only a limited amount of information needed to establish peering, as opposed to copying all information. For example, if VM_A 238 in first network 230 seeks to peer with VM_B in second network 250, the OHC 234 in first network 230 obtains only enough information from SDN controller 252 in the second network 250 to allow the VM_A 238 to communicate with the VM_B 258. In a third layer, a programmable packet switcher 236, 238 in each network 230, 250 exchanges packets between the networks 230, 250 once the peering relationship is established.

Each SDN controller 232, 252 may be, for example, an application in the SDN architecture that manages flow control. For example, each SDN controller 232, 252 may be a software system or collection of systems that together provides management of network state, a high-level data model that captures the relationships between managed resources, policies and other services provided by the controller, an application programming interface (API) that exposes controller services to an application, etc. In some examples, the SDN controller may further provide a secure TCP control session between itself and associated agents in the network. Each SDN controller 232, 252 may run on a server, and use protocols to tell the programmable packet switcher 236, 238 where to send packets. The SDN controllers 232, 252 may direct traffic according to one or more forwarding policies. An interface or protocol allows the SDN controllers 232, 252 to communicate with other devices in the networks 230, 250. For example, the SDN controller 232 in the first network 230 may use such interface or protocol to communicate with the OHC 234. The SDN controller 232 programs the OHC 234 to pull programming from the second SDN controller 252 in the second network 250. Similarly, the second SDN controller 252 in the second network 250 programs the OHC 254 to pull programming from the first SDN controller 232 in the first network 230. Such programming information pulled by the OHCs 234, 254 is used to establish a peering relationship.

Each OHC 234, 254 may run on a same host as its associated VM 238, 258. For examples, first OHC 234 may run on a same first host as VM_A 238, and second OHC 254 may run on a same second host as VM_B 258. Each host may have an instance used to control the VMs 238, 258.

Each OHC 234, 254 may obtain information from the SDN controllers 232, 252. For example, the OHC 234, 254 obtains first information from the SDN controller 232, 252 in its own network. For example, such first information may include information about the VM 238, 258 in the same network. As another example, such first information may include programming information from the SDN controller 232, 252 in the same network, such programming information providing instructions for the OHC to pull second information from the SDN in another network. Such second information obtained from the SDN in the other network may include connectivity information to establish peering between the networks.

According to some examples, the OHC 234, 254 in one network may subscribe to the SDN controller 232, 252 in the other network. For example, the first OHC 234 may subscribe with a local virtual machine controller to an endpoint meta-service, and receive updates about each VM_A 238 on the same host as the OHC 234. For each endpoint received from the endpoint meta-service, the OHC 234 uses a corresponding identifier to subscribe to a peering service through which it receives updates on the second network 250.

When the first network 230 is attempting to establish a peering connection with the second network 250, the first OHC 234 boosts only as much connectivity information from the second SDN controller 252 in the second network 250 as is needed to establish the connection. According to some examples, such connectivity information may include location information, load balancer information, transmittivity information, or any other information that may inform the VM_A 238 how to reach peer VM_B 258. The location information may include, for example, an IP address, such as a destination address, forwarding information, node identifiers, etc. For example, the OHC 234 may use a corresponding endpoint identifier, peer network identifier, and host IP address to subscribe to destination and forwarding services for the second network 250. When corresponding updates are received from the destination and forwarding services, the OHC 234 can use the updates to create a flow from VM_A 238 to VM_B 258.

The OHCs 234, 254 push programming from the SDN controller 232, 252 to the programmable packet switchers 236, 256. For example, when the first OHC 234 receives the first information from the SDN controller 232 in its network 230 and the second information from the SDN controller 252 in the second network 250, it may push an aggregate of the first and second information to the packet switcher 236. Upon receiving a packet from the VM_A 238, the packet switcher 236 can directly forward the packet to the location of VM_B 258 without any proxy. By way of example only, the programmable packet switcher can modify a header of the packet or encapsulate the packet with an additional header, wherein such header information for routing the packet directly to the VM_B was received from the SDN controller 252 via the OHC 234.

The programmable packet switcher 236, 256 may be, for example, a data plane control, an application specific integrated circuit (ASIC), a network interface controller (NIC), a logical switch, or any other types of programmable switch. The programmable packet switcher 236, 256 may be adapted to execute any of a variety of programs, such as programs from the SDN controllers 232, 252 for sending and/or receiving packets between the networks 230, 250.

Each of VM_A 238 and VM_B 258 may be a virtual environment that functions as a virtual computer system with its own central processing unit (CPU), memory, network interface, storage, etc. The first VM_A 238 of the first network 230 may share a host machine with the OHC 234. Similarly, the second VM_B 258 in the second network 250 may share a host machine with the OHC 254. In other examples, the VMs, OHCs, and/or SDNs may reside on any combination of independent host machines that are coupled to enable communication between the devices in each network.

While two networks 230, 250 are shown, it should be understood that peering may be established among any number of networks. The peering may be a bidirectional peering relationship, wherein each network sees the other network and also shares its own resources with the other network. In other examples, the peering may be a one-way peering, such as where the first network peers into the second network, but does not allow the second network to peer into the first network. While a limited number of components are illustrated within each network 230, 250, it should be understood that additional components may be present. By way of example only, each network 230, 250 may include multiple VMs or other resources. As another example, each network may include a VPN, interconnect, or other components for establishing peering between the networks.

The architecture described in connection with FIG. 2 provides a high bandwidth peering connection, as each VM can use a full egress bandwidth to communicate across the network. Accordingly, the networks can use full fabric cross-section bandwidth for communication. Moreover, because no proxies are needed to establish the communication between networks, the architecture is highly reliable.

Figure 3:
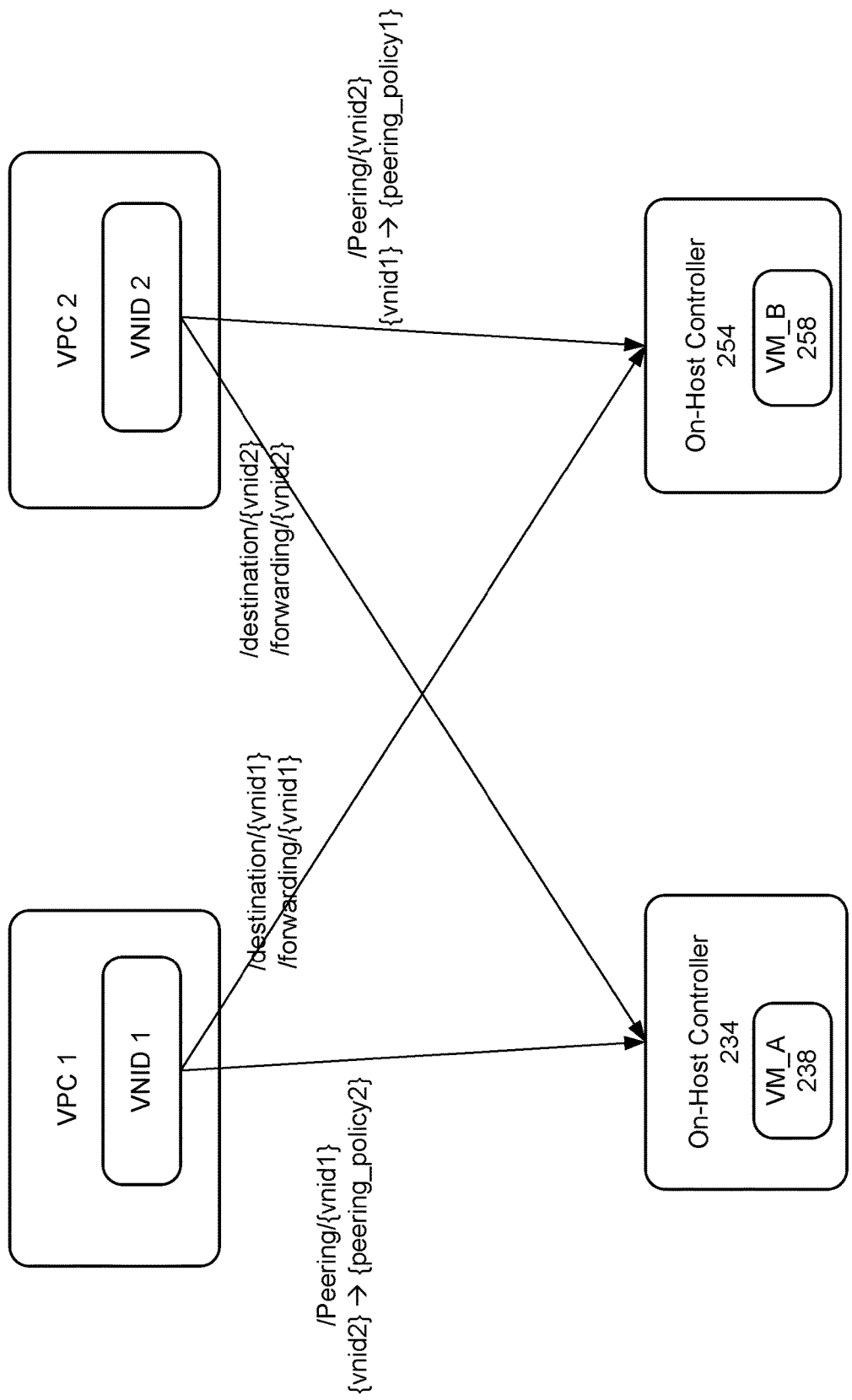
FIG. 3 is a block diagram illustrating example details of cross-VPC connectivity according to aspects of the disclosure.

FIG. 3 illustrates an example of establishing a peering connection, including communications with OHCs 234, 258 in a first VPC and second VPC, respectively. OHC 234 may receive, from the first VPC, peering information identifying other VPCs for peering, such as VPC 2. For example, such peering information may include a virtual local area network extension identifier (VNID) for peer VPC2.

The OHC 234 uses the received peering information to obtain connectivity information, such as destination and forwarding information, for the VM_B 258 in VPC2. For example, the OHC 234 may use the VNID for peer VPC2 to obtain such destination and forwarding information. According to some examples, the OHC 234 may subscribe to destination and/or forwarding services of the VPC2 for updates. The OHC 234 may receive such destination and forwarding information for each virtual machine or other endpoint in the VPC2. Using the obtained information, the OHC 234 can create a flow from VM_A 238 to VM_B 258. The flow may be created using, for example, a virtual internet protocol (IP) address of the VM_A 238, the VNID to which the VM_A 238 belongs, a physical IP address of a host that contains the VM_A 238, a virtual IP address of the VM_B 258, a peer VNID to which the VM_B 258 belongs, and a physical IP address of a host that contains VM2. A flow in the reverse direction, from VM_B 258 to VM_A 238, may be programmed similarly when the second OHC 254 obtains the peering information from the VPC2 and the connectivity information from the VPC1.

Figure 4:
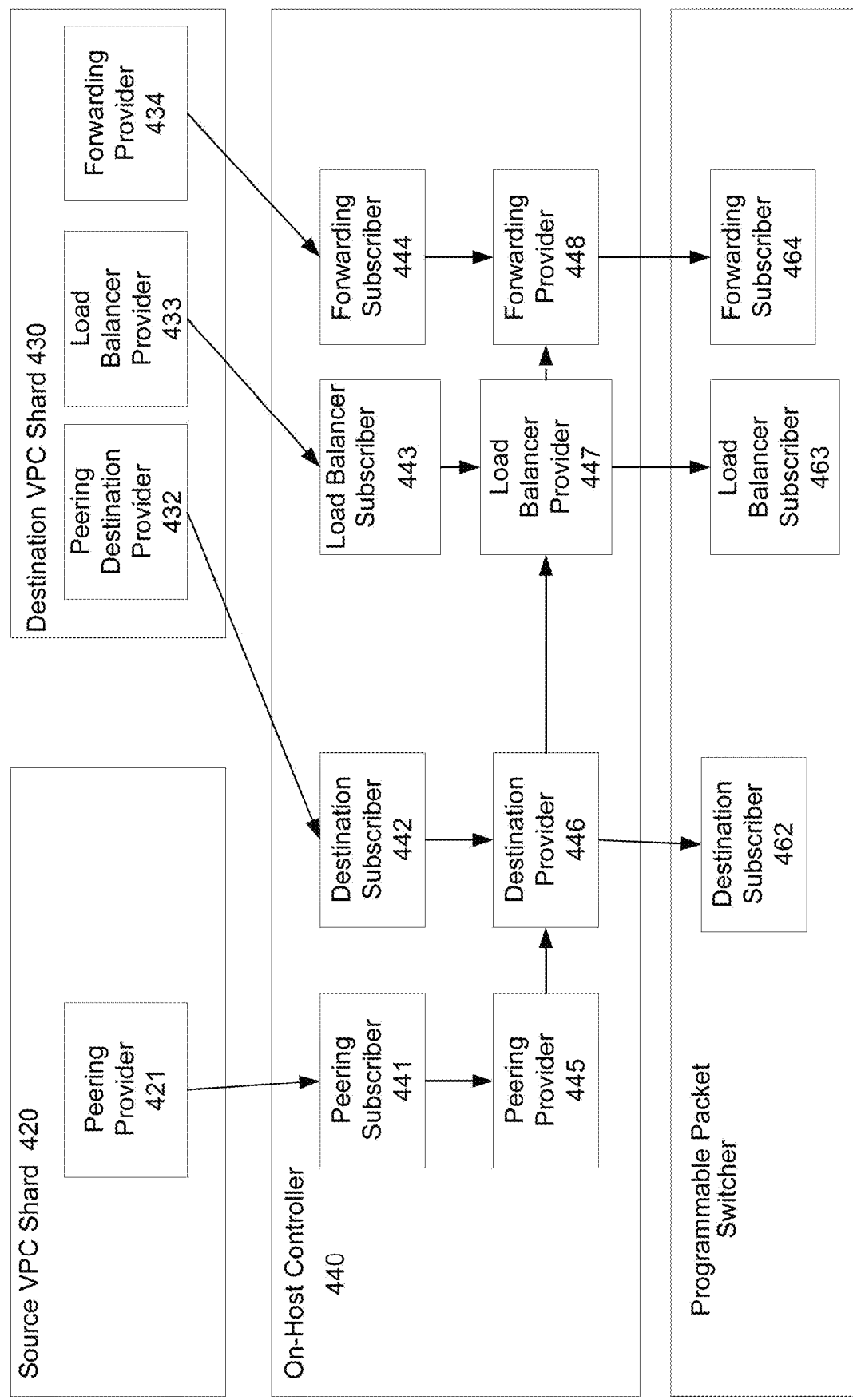
FIG. 4 is a block diagram illustrating components of an on-host controller used for establishing peering, according to aspects of the disclosure.

FIG. 4 illustrates additional details of the OHC 234 in a first network, such as a first VPC, used for pairing with a second network, such as a second VPC.

As shown, source VPC shard 420 includes peering provider 421. Peering provide 421 may be, for example, a service or module that provides peering information to peering subscriber 441 of on-host controller (OHC) 440. As described above, the peering information may include an identifier for other VPCs. In the present example, the peering provider 421 may provide an identifier for destination VPC shard 430 to the peering subscriber 441.

Using the peering information obtained by the peering subscriber 441, the OHC 440 subscribes to the destination VPC shard 430. As such, the OHC 440 may obtain connectivity information for each virtual machine or other endpoint in the destination VPC shard 430, and use the connectivity information to establish a direct peering connection between a virtual machine or other endpoint in the source VPC shard 420 and each virtual machine or other endpoint in the destination VPC shard 430. Peering destination provider 432 in the destination VPC shard 430 provides destination information to destination subscriber 442 in the OHC 440. The information may be provided for each virtual machine in the destination VPC shard 430. Peering destination provider 432 may be, for example, a routing table or module in communication with a routing table. The destination information provided to the destination subscriber 442 may be routing table information. Load balancer provider 433 in the destination VPC shard 430 provides load balancer information to load balancer subscriber 443 in the OHC 440. Such load balancer information may include, for example, an indication of a current workload for a given virtual machine in the destination VPC, an indication of capacity of the given virtual machine, or other information. Forwarding provider 444 provides forwarding information to forwarding subscriber 444 in the OHC 440.

The subscribers 441, 442, 443, 444 in the OHC 440 may each communicate with a corresponding set of providers 445, 446, 447, 448. According to some examples, the providers 445, 446, 447, 448 may communicate with each other also. Peering provider 445 receives peering information from the peering subscriber 441. Destination provider 446 in the OHC 440 receives the destination information from the destination subscriber 442 of the OHC 440 and provides it to a destination subscriber 462 in packet switcher 460. Load balancer provider 447 in the OHC receives load balancing information from the load balancer subscriber 443 and provides it to load balancer subscriber 463 of the packet switcher 460. Forwarding provider 448 receives the forwarding information from the forwarding subscriber 444 in the OHC 440 and provides it to forwarding subscriber 464 in the packet switcher 460. The packet switcher 460 uses the information from the OHC providers 446, 447, 448 to establish a peering connection with individual virtual machines or other endpoints in the destination VPC shard 430.

Figure 5:
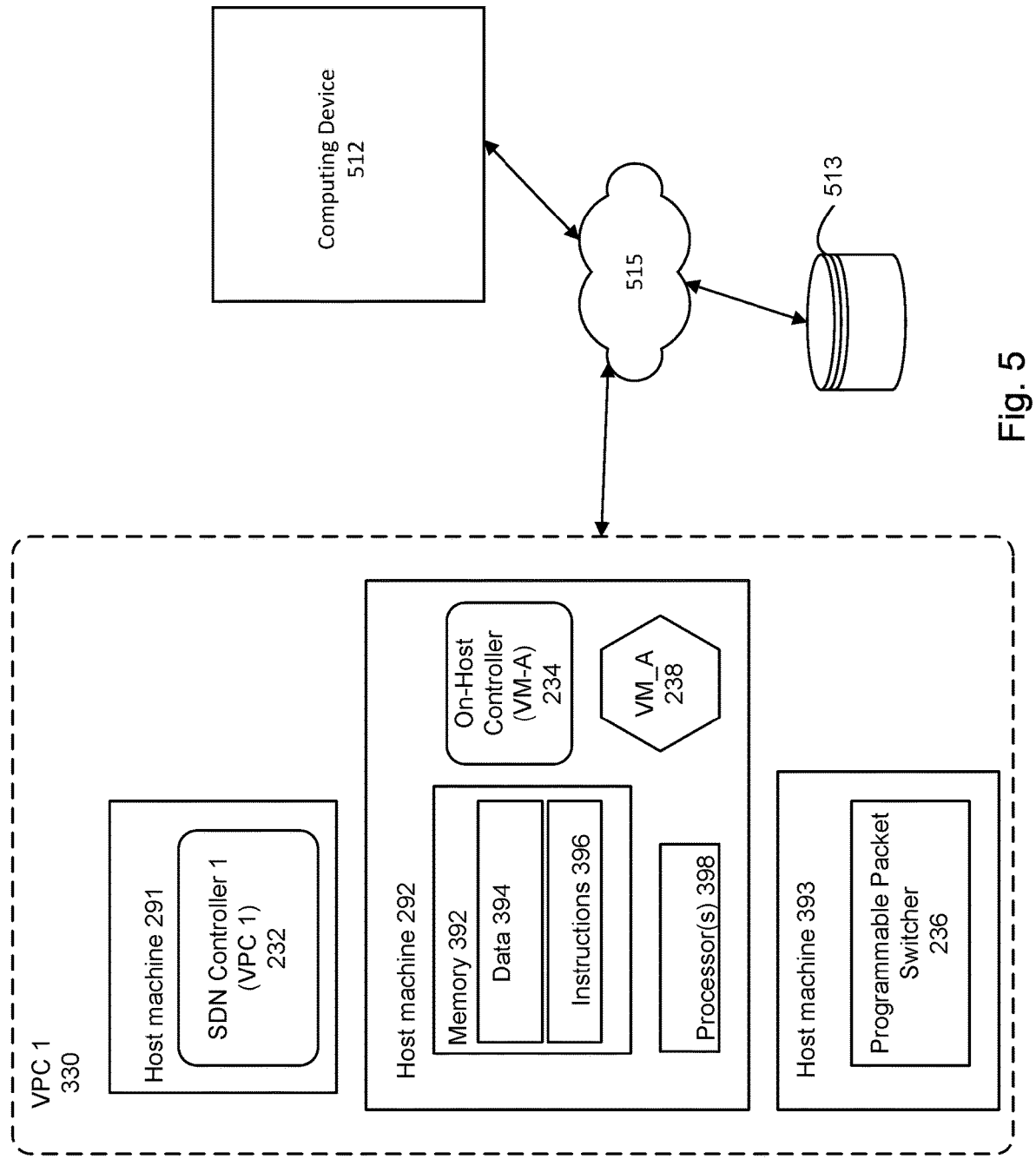
FIG. 5 is a block diagram illustrating an example hardware environment according to aspects of the disclosure.

FIG. 5 is a block diagram of an example environment for implementing the system described above. The system can be implemented on one or more devices having one or more processors in one or more locations, such as on one or more host machines 291, 292, 293 in a VPC 330.

The one or more host machines 291-293 in the VPC 330 may be coupled to one or more computing devices 512, one or more storage devices 513, and/or any of a variety of other types of devices over a network 515. The storage device(s) 513 can be a combination of volatile and non-volatile memory, and can be at the same or different physical locations than the computing devices 512. For example, the storage device(s) 513 can include any type of non-transitory computer readable medium capable of storing information, such as a hard-drive, solid state drive, tape drive, optical storage, memory card, ROM, RAM, DVD, CD-ROM, write-capable, and read-only memories.

The storage device(s) 513, in some examples, may be part of the VPC 330. The VPC330 can be configured to perform a number of cloud computing platform services using the host machines 291-293 and/or storage 513, such as hosting cloud storage for data back-up, or hosting one or more virtual machines accessible by computing device 512 in communication therewith.

Each host machine 291-293 can include one or more processors, memory, and/or other components typically found on host machines. Memory 392 can store information accessible by the processor(s) 398, including instructions 396 that can be executed by the processor(s) 398. The memory 392 can also include data 394 that can be retrieved, manipulated or stored by the processor(s) 398. The memory 392 can be a type of non-transitory computer readable medium capable of storing information accessible by the processor(s) 398, such as volatile and non-volatile memory. The processor(s) 398 can include one or more central processing units (CPUs), graphic processing units (GPUs), field-programmable gate arrays (FPGAs), and/or application-specific integrated circuits (ASICs), such as tensor processing units (TPUs).

The instructions 396 can include one or more instructions that when executed by the processor(s) 398, cause the one or more processors to perform actions defined by the instructions. The instructions 396 can be stored in object code format for direct processing by the processor(s) 398, or in other formats including interpretable scripts or collections of independent source code modules that are interpreted on demand or compiled in advance. The instructions 396 can include instructions for implementing the system consistent with aspects of this disclosure. Instructions 396 may further be executed to identify particular processes of virtual machines 238.

The data 394 can be retrieved, stored, or modified by the processor(s) 398 in accordance with the instructions 396. The data 394 can be stored in computer registers, in a relational or non-relational database as a table having a plurality of different fields and records, or as JSON, YAML, proto, or XML documents. The data 394 can also be formatted in a computer-readable format such as, but not limited to, binary values, ASCII or Unicode. Moreover, the data 394 can include information sufficient to identify relevant information, such as numbers, descriptive text, proprietary codes, pointers, references to data stored in other memories, including other network locations, or information that is used by a function to calculate relevant data.

Although FIG. 5 illustrates the processors 398 and the memory 392 as being within the host machine 292, the processors 398 and the memories 392 can include multiple processors and memories that can operate in different physical housings and/or locations. For example, some of the instructions 396 and the data 394 can be stored on a removable SD card and others within a read-only computer chip. Some or all of the instructions and data can be stored in a location physically remote from, yet still accessible by, the processors 398. Similarly, the processors 398 can include a collection of processors that can perform concurrent and/or sequential operation. The host machines 291-293 can each include one or more internal clocks providing timing information, which can be used for time measurement for operations and programs run by the host machines.

Host machines 291, 293 may be configured similarly to the host machine 292, including memory, processors, and other components. The computing device 512 can also include one or more processors, memory, and other components.

The host machine 292 can be configured to receive requests to process data from the computing device 512. For example, the VM_A 238 may provide a variety of services to users, through various user interfaces and/or APIs exposing the platform services. For example, one or more services can be a machine learning framework or a set of tools for managing software applications programmed to offer a particular service.

The device 512 and the host machine 292 can be capable of direct and indirect communication over the network 515. The devices can set up listening sockets that may accept an initiating connection for sending and receiving information. The network 515 itself can include various configurations and protocols including the Internet, World Wide Web, intranets, virtual private networks, wide area networks, local networks, and private networks using communication protocols proprietary to one or more companies. The network 515 can support a variety of short- and long-range connections. The short- and long-range connections may be made over different bandwidths, such as 2.402 GHz to 2.480 GHz 2.4 GHz and 5 GHz; or with a variety of communication standards, such as standards for wireless broadband communication. The network 515, additionally or alternatively, can also support wired connections between the devices, including over various types of Ethernet connection.

Although a single VPC and computing device 512 are shown in FIG. 5, aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

Figure 6:
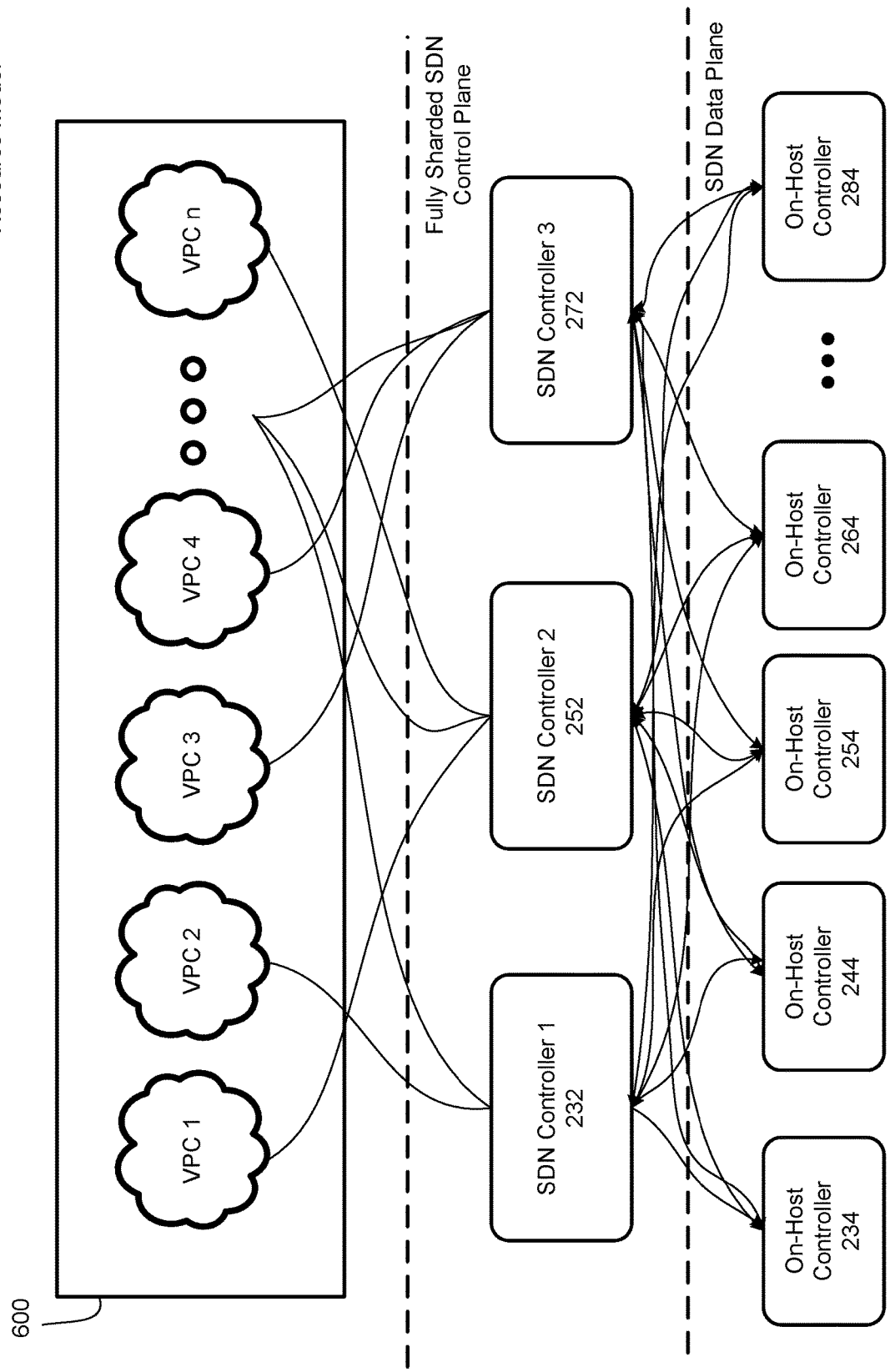
FIG. 6 is a block diagram illustrating connection between a peering group and a SDN data plane via a fully sharded SDN control plane, according to aspects of the disclosure.

FIG. 6 is a block diagram illustrating connection between a peering group and a SDN data plane via a fully sharded SDN control plane. In this example, a resource model includes a plurality of networks, such as VPCs 1-*n*, in a peering group 600. In the peering group 600, each VPC 1-*n* is connected with each other. While several VPCs are shown, it should be understood that any number of VPCs may be included in the peering group 600.

Because only a limited amount of information needed for peering between the VPCs is pulled, an SDN control plane may be sharded. In this example, a fully sharded SDN control plane includes a plurality of SDN controllers 232, 252, 272. Each SDN controller 232, 252, 272 is responsible for a subset of VPCs1-*n*. For example, the peering group 600 may be sharded or partitioned such that each VPC1-*n* is associated with one SDN controller 232, 252, 272. Each SDN controller 232, 252, 272 may control one, two, three, or any other number of VPCs1-*n*. For example, as shown, a first SDN controller 232 controls VPC2 and another VPC, a second SDN controller 252 controls VPC1, VPCn, and another VPC. SDN controller 272 controls VPC3, VPC4, and another VPC.

Each SDN controller 232, 252, 272 may communicate with each of a plurality of OHCs 234, 244, 254, 264, 284, etc. in an SDN data plane. Each OHC may be associated with one of the VPCs in the peer group 600. For example, OHC 234 may be associated with VPC1, OHC 244 may be associated with VPC2, OHC 254 may be associated with VPC3, etc. The full mesh connectivity between each SDN controller 232, 252, 272 and each OHC 234-284 provides for the connectivity among each VPC1-*n* in the peering group 600. For example, because each OHC 234-284 is coupled to each SDN controller 232, 252, 272, the OHC for any given VPC can pull connectivity information from a particular SDN controller that is responsible for another VPC with which the given VPC is to peer. By way of example, if VPC2 is to peer with VPC3, OHC 244 that is associated with VPC2 may pull connectivity information for VPC3 from SDN controller 272 to establish the peering relationship.

The fully sharded SDN control plane provides scalability for connecting a large number of VPCs. By way of example only, thousands of peers or more may be connected. The SDN data plane, including the OHCs 234-284, pulls minimal programming information from the SDN controllers 232-272 on demand.

Figure 7:
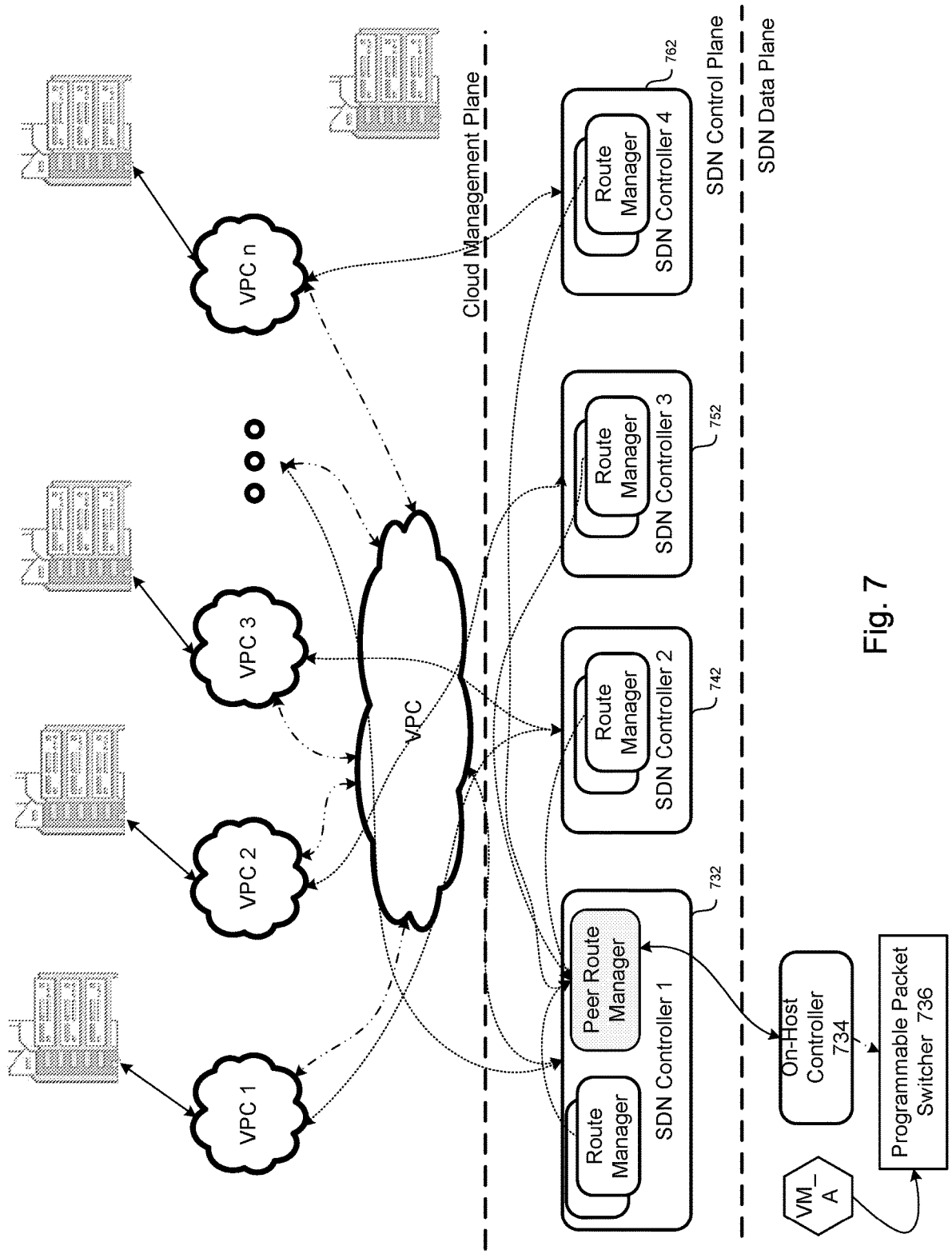
FIG. 7 is a block diagram illustrating route conflict resolution across peered VPCs, according to aspects of the disclosure.

FIG. 7 provides an example of route conflict resolution across peered VPCs. For example, all virtual machines using an on-premise router in a VPC may have IP addresses within a particular range, and a BGP announcement may be made to other devices to use such IP addresses to reach the virtual machines. Such routes may be received and managed using, for example, a route manage in an SDN controller. All routes learned from a VPC's on-premises router may be provided to a peer VPC, which can use the same addresses. In such instances, a conflict may arise between a route including the on-premises router for the first VPC and a route including an on-premises router for the peer VPC.

If a route conflict arises, SDN controllers 732, 742, 752, 762 can communicate with each other to resolve the conflict. For example, each SDN controller 732, 742, 752, 762 may include a route manager. One or more or all of the SDN controllers 732, 742, 752, 762 may also include a peer route manager. For example, the peer route manager may be a separate module used for resolving conflicts, while the route managers are used to communicate the routes for reaching virtual machines or other endpoints in a VPC. One SDN controller may be designated for resolving the route conflict using the peer route manager. For example, the SDN controller that is responsible for programming VM egress may perform route conflict resolution. For example, the SDN controllers 732, 742, 752, 762 may exchange routes with each other over other services, such as by using the route manager to communicate the route information to the peer route manager of the SDN controller responsible for the resolution, illustrated as SDN controller 732 in the present example. Such routing information communicated among the SDN controllers may include routing information from VPC1 to complete a routing table, such as a destination address. The SDN controller 732 uses a pre-defined set of rules to determining a winning route when there is a conflict, and publishes the winning route to OHC 734. In turn, the OHC 734 publishes the winning route, along with other relevant information pulled from the SDN controllers 732-762, to programmable packet switcher 736.

According to some examples, the pre-defined set of rules for resolving route conflicts may relate to priority of routes. For example, one rule may be that routes in a local network have higher priority than routes in a peer network. This may ensure that local traffic is not redirected or taken away to a remote network. According to some examples, each peer network may have an associated preference, and routes may be assigned a priority based on that preference. In some examples, a value of an identifier may be used to determine priority, such as by assigning priority to a higher or lower number identifier. According to further examples, priority may be assigned based on a routing policy associated with a peer network.

Figure 8:
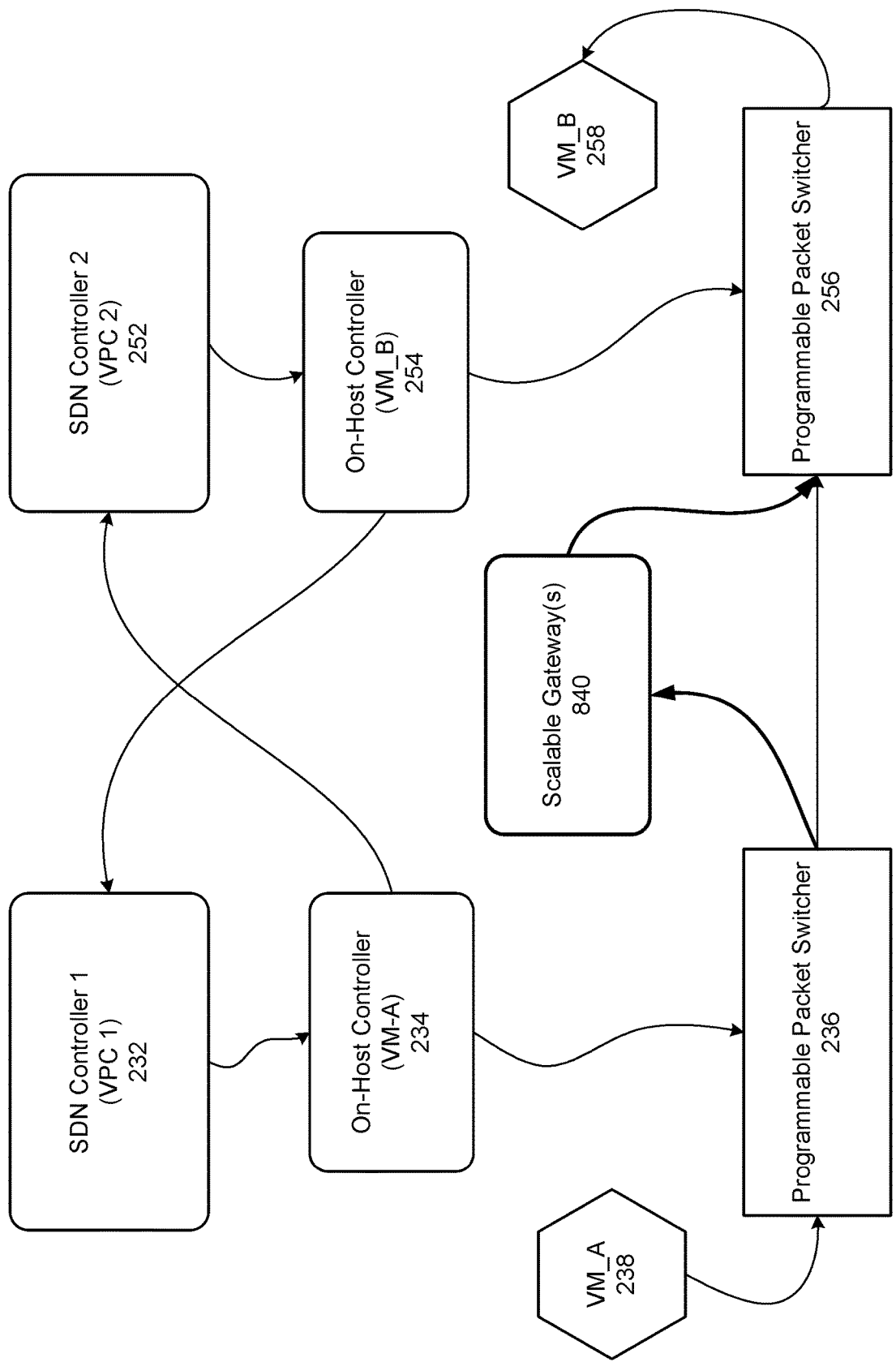
FIG. 8 is a block diagram illustrating scalable cross-VPC connectivity via gateways, according to aspects of the disclosure.

FIG. 8 illustrates an example of scalable cross-VPC connectivity via gateways. For example, one or more scalable gateways 840 may be implemented between programmable packet switcher 236 of a first VPC and programmable packet switcher 256 of a second VPC. When the programmable packet switch 236 receives a packet from VM_A 238, the packet switcher 236 may load balance the packet to the one or more scalable gateways 840. The one or more scalable gateways 840 may have full network state, and forward the packets to a destination, such as programmable packet switcher 256. For example, the scalable gateways 840 may see every virtual machine, load balancer, or other endpoint in each VPC.

According to some examples, the one or more scalable gateways 840 may be a pool of scalable gateways. Each scalable gateway may be, for example, a dedicated hardware unit, a virtual machine, virtual router, or other gateway.

According to some examples, the scalable gateways 840 may be used to shift traffic from a first VPC to one or more second VPCs when the first VPC becomes overloaded. For example, the scalable gateways 840 may monitor traffic demands and capacity within the first VPC, as well as for the one or more second VPCs. When a load on VM_A 238 in the first VPC becomes too high relative to its capacity, the scalable gateway may shift traffic to one or more second VPCs using a peering connection established by the OHC 234 of the first VPC. According to some examples, the scalable gateways 840 may prompt the OHC 234 to initiate the peering and/or to request connectivity information from the SDN controller 252 of the second VPC. Accordingly, the VM_B 258 of the second VPC may share some of the load of the VPC_A 238.

Figure 9:
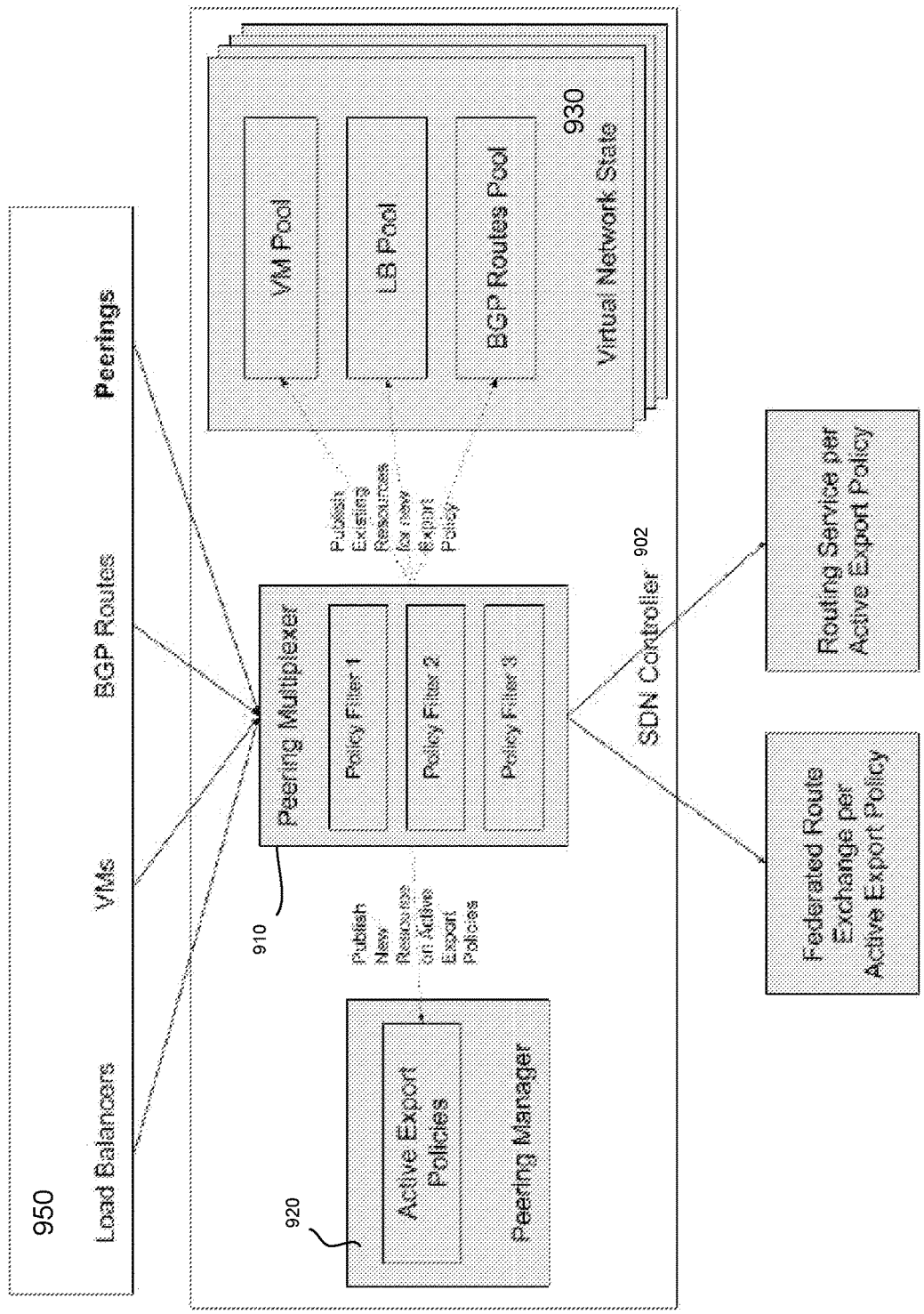
FIG. 9 is a block diagram illustrating cross-network multiplexing according to aspects of the disclosure.

FIG. 9 illustrates an example of cross-network multiplexing. Each VPC publishes resources 950, such as resources from load balancers, virtual machines, BGP routes, peering, etc., to a peering multiplexer 910 in SDN controller 902. The peering multiplexer 910 uses such published resources to derive a virtual network state 930. The virtual network state 930 may indicate all resources in a network, such as all virtual machines across all VPCs, all load balancers across all VPCs, all BGP routes across all VPCs, etc.

The peering multiplexer 910 in SDN controller 902 may be used to apply peering policies when processing updates for endpoints, ILBs, subnets and routes. The peering multiplexer 610 may, for each resource, keep track of which peering-related services need to be updated. Moreover, for each peering policy, the peering multiplexer 910 may create peering-related services by pulling resource state from resource-managers. Depending on the policy, the peering multiplexer 910 may filter out programming on peering-related services.

Peering manager 920 maintains a map of all peering policies that are relevant to the VPC. For example, for each peering-policy, it maintains a list of identifiers of peer networks that are using the policy. The policies may include, for example, filtering policies or other types of policies. The filtering policies may determine whether particular protocols are allowed, whether particular routes are allowed, whether particular addresses or subnets are allowed, or any combination of these or other parameters, etc. Each pair of VPC pairings may have an independent policy, referred to as active export policies, which may be managed by peer manager 920.

The SDN controller 902 can publish information on routing to resources such as VMs and load balancers. The SDN controller 902 can also publish information on border gateway protocol (BGP) routes for federation. Federation refers to all SDNs communicating with each other to exchange routes and resolve route conflicts. For example, the peer multiplexer 910 may provide federated route exchange information, such as when communicating between a route manager and a peer route manager as illustrated in FIG. 7. Peer multiplexer 910 may provide policies to routing service, such as the SDN controller providing peering information to the OHC.

Different services may be published per connectivity policy per VPC. For example, different services may be published for an IPv6 only policy, a specific exported LP ranges policy, a private addresses only policy, etc. A resource can be published on multiple services simultaneously. Multiplexing may be performed on the resources based on export policies for a VPC.

The SDN controller 901 may provide for optimized policy based filtering. The SDN controller 901 may determine the set of unique active peering exchange policies for each VPC using peering manager 920. Peering multiplexer 910 then only publishes the set of resources for each unique exchange policy per VPC. The SDN controller 902 and programmable hosts responsible for a peered VPC then subscribe to the appropriate set of resources based on an exchange policy identifier. This multiplexer architecture results in a much smaller set of services published as compared to an architecture in which a different set of resources is published between each pair of peered VPC.

Figure 10:
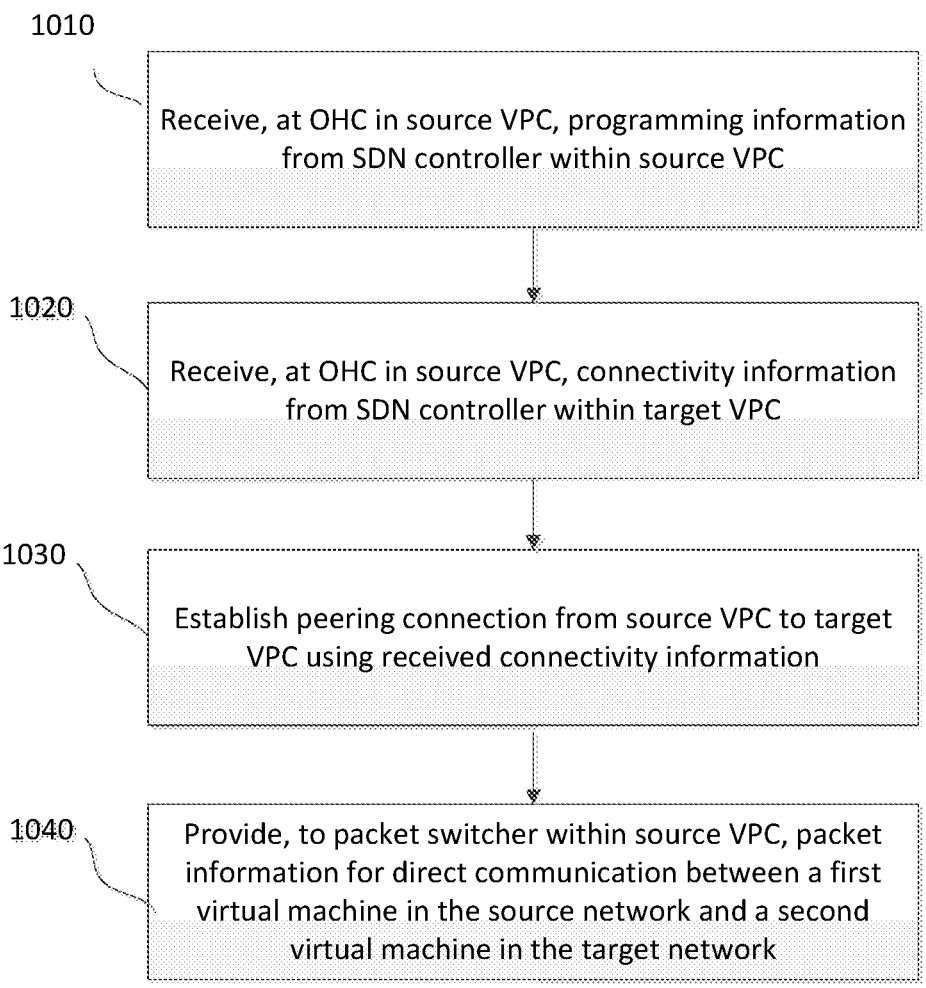
FIG. 10 is a flow diagram illustrating an example method according to aspects of the disclosure.

FIG. 10 illustrates an example method 1000 of establishing a peering connection between VPCs. While operations are described in a particular order, the order may be modified. In some examples, operations may be performed in parallel. In some examples, operations may be added or omitted. The operations are described in the method 1000 from a perspective of an OHC in a source network in establishing peering with a target network. Corresponding operations may be performed by other components, such as SDN controllers, packet switchers, and the like.

In block 1010, the OHC in a source VPC receives programming information from a SDN controller within the source VPC. The programming information may include, for example, an identification of peer networks, policy identifiers, and information for use by the source OHC in reaching a target SDN controller of the target VPC.

In block 1020, the source OHC receives connectivity information from the target SDN controller in the target VPC. For example, such connectivity information may include a destination address for the VPC, such as an IP address for a target virtual machine in the target VPC. Such connectivity information may include forwarding information for sending packets to the target VPC. The source OHC may subscribe to a service of the target VPC and thereby receive updates in connectivity information from the target VPC.

In block 1030, the source OHC controller establishes a peering connection from the source VPC to the target VPC using the received connectivity information. Such peering connection may be established based on the limited connectivity information received, without requiring a copy of the entire target VPC. Moreover, such peering connection may be established without any proxies.

In block 1040, the source OHC provides packet information to the packet switcher in the source VPC. Such packet information may be used for direct communication between a first virtual machine in the source VPC and a second virtual machine in the target VPC. The packet information may include, for example, destination, forwarding, and authentication information received from the target SDN controller. Accordingly, the source packet switcher may exchange packets directly with the target VPC, without proxies.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invenetion claimed is:

1. A system, comprising:
   a software-defined networking (SDN) controller;
   an on-host controller; and
   a programmable packet switcher;
   wherein the SDN controller, on-host controller, and programmable packet switcher are communicatively coupled within a first network;
   wherein the on-host controller in the first network receives programming information from the SDN controller in the first network, the programming information providing instructions for the on-host controller to pull limited connectivity information directly from a second SDN controller in a target network, and use the limited connectivity information to establish a proxyless peering connection between the first network and the target network.

2. The system of claim 1, further comprising a first virtual machine within the first network.

3. The system of claim 2, wherein the first virtual machine and the on-host controller reside on a same host machine.

4. The system of claim 1, wherein the first network is a virtual private cloud (VPC).

5. The system of claim 1, wherein the limited connectivity information comprises a destination address in the target network.

6. The system of claim 5, wherein the limited connectivity information further comprises forwarding information.

7. The system of claim 1, wherein the programmable packet switcher delivers packets from a first virtual machine in the first network to a second virtual machine in the target network using the limited connectivity information.

8. The system of claim 1, wherein the first network includes a plurality of endpoints, and wherein each endpoint in the source network is adapted to communicate directly with each endpoint in the target network using the proxyless peering connection.

9. The system of claim 1, further comprising a plurality of SDN controllers in a fully sharded control plane, each of the plurality of SDN controller responsible for a subset of virtual private cloud (VPC) networks in a peering group, each VPC network having an associated on-host controller, wherein each of the plurality of SDN controllers is coupled to each of the associated on-host controllers.

10. The system of claim 1, further comprising a scalable gateway between the programmable packet switcher of the first network and a second programmable packet switcher of the target network.

11. A method of establishing a peering connection between a first network and a second network, the method comprising:
   receiving, at an on-host controller in the first network, programming information from a first controller within the first network, the programing information providing instructions for the on-host controller to pull connectivity information directly from a second controller within the second network;
   pulling, at the on-host controller in the first network, connectivity information directly from the second controller within the second network;
   establishing a proxyless peering connection between the first network and the second network using at least the connectivity information; and
   providing, to a packet switcher within the first network, packet information for direct communication between a first endpoint in the first network and a second endpoint in the second network.

12. The method of claim 11, wherein the first endpoint is a virtual machine.

13. The method of claim 11, wherein receiving the connectivity information from the second controller comprises using the programming information from the first controller to subscribe to the second controller.

14. The method of claim 11, wherein the connectivity information comprises a destination address in the second network and forwarding information.

15. The method of claim 11, further comprising delivering, by a programmable packet switcher, packets from a first virtual machine in the first network to a second virtual machine in the second network using the connectivity information.

16. A software-defined networking (SDN) controller configured to establish a peering connection between a first network that includes the SDN controller and a second network, the SDN controller comprising:
   memory; and
   one or more processors in communication with the memory, the one or more processors configured to:
     provide programming information to an on-host controller in the first network, the programming information identifying the second network, the programming information providing instructions for the on-host controller to pull limited connectivity information directly from a second SDN controller; and
     cause the on-host controller to subscribe to the second SDN controller in the second network and pull the limited connectivity information directly from the second SDN controller.

17. The SDN controller of claim 16, comprising a peering multiplexer configured to receive information from a plurality of resources and publish routing information for communicating with the resources.

18. The SDN controller of claim 17, comprising a peering manager maintaining one or more export policies for the first network, wherein the peering multiplexer performs multiplexing on the resources based on the export policies.

19. The SDN controller of claim 16, comprising a routing manager configured to receive route information from one or more other SDN controllers.

20. The SDN controller of claim 19, wherein the SDN controller is configured to identify route conflicts based on the route information received and to resolve the conflict using a pre-defined set of rules.

\* \* \* \* \*